June 11, 1940.   G. MEYER   2,204,143
CONTROL DEVICE FOR CHANGE-SPEED GEARS
Filed Aug. 21, 1937   2 Sheets-Sheet 2

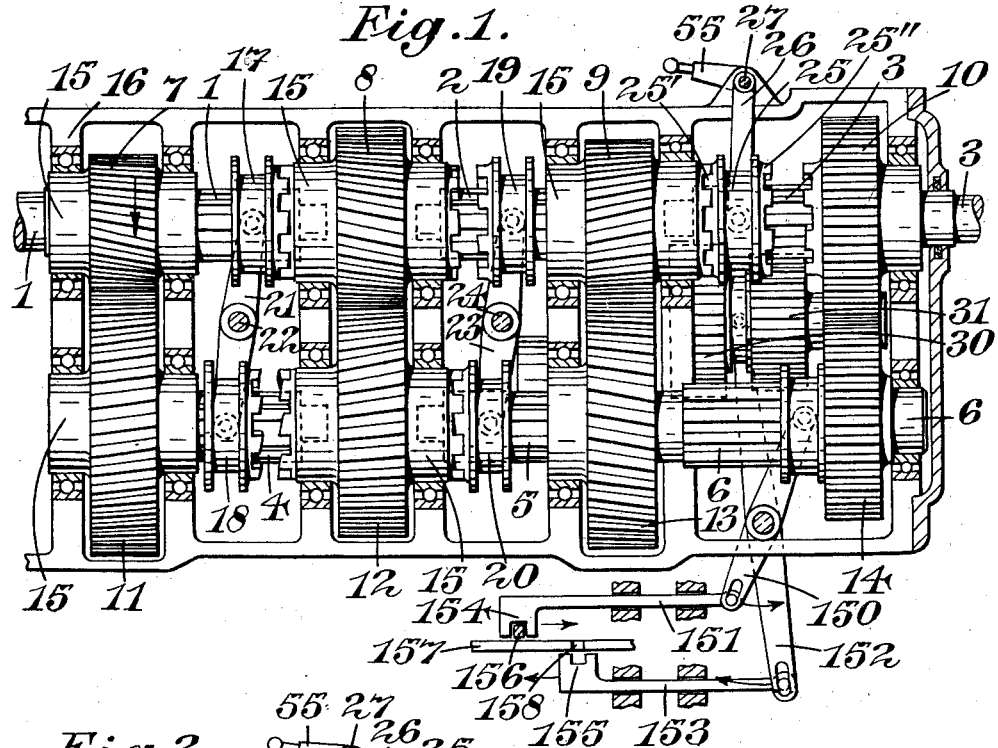

Gustav Meyer
By
Watson, Cole, Grindle & Watson
Attys.

Patented June 11, 1940

2,204,143

UNITED STATES PATENT OFFICE 2,204,143

CONTROL DEVICE FOR CHANGE-SPEED GEARS

Gustav Meyer, Friedrichshafen-on-the-Bodensee, Germany, assignor to Maybach-Motorenbau Gesellschaft mit beschrankter Haftung, Friedrichshafen-on-the-Bodensee, Germany, a corporation of Germany Application August 21, 1937, Serial No. 160,314
In Germany August 28, 1936

6 Claims. (Cl. 74—364)

The invention relates to a control device for the pressure medium of the operating mechanism of change-speed gears, particularly in motor vehicles, and in particular of gears in which the gear-changing members of two transmission stages or the clutches of these stages are connected together and are alternately changed, in certain cases without the gear change rod occupying a middle position. In such gears, a gear-changing cylinder is provided in each case for two transmission stages which are to be engaged alternately for example by dog clutches or change speed clutches. For the engagement of one stage, an acceleration of one of the two clutch members is necessary in known manner, and for the insertion of the other stage a retardation is necessary, which in both cases may be effected either by the driver by opening or closing the throttle or by means of known auxiliary devices specially provided for the purpose. The supply of pressure medium to one side of each gear-changing cylinder or piston therefore effects the movement for the engagement of a clutch member to be accelerated (acceleration gear change), and the other side the movement for the engagement of a clutch member which is to be retarded (retardation gear-change).

According to the invention, in such a control device, shut-off members are provided for the pressure medium supplied to individual or all of the gear-changing cylinders, which are in communication with the other gear-changing cylinders or are dependent upon the other gear-changing cylinders themselves. These shut-off members prevent the admission of pressure medium to those sides of the control cylinders which produce an acceleration or retardation gear change as long as one of the other gear-changing cylinders is operative for the purpose of a retardation or acceleration gear change. Preferably, the arrangement is so contrived that the retardation gear change is always operative before the acceleration gear change.

Pressure medium control devices for the gear-changing of gear wheel change speed gears are known wherein each gear-changing cylinder only operates one transmission stage. In these known constructions, the pressure medium to be supplied to the gear-changing cylinders, both for the movement of a clutch member which is to be accelerated on engagement and also for a clutch member to be retarded, is conducted through control members formed by the piston rods of all the other gear-changing cylinders. This results in a very complicated, heavy and expensive construction. This construction is therefore limited to gear-changing cylinders which only operate one transmission stage.

Control devices are also known for cylinders having two operative positions and one central position, the admission of pressure medium to another cylinder being controlled by a control member connected to each cylinder (provided on the piston rod). In these devices, the supply of pressure medium to both sides of the cylinder is controlled in each case by the other cylinders. Such devices are only very rarely employed for the same reasons as those first mentioned. Their disadvantages are serious particularly in the case of change-speed gears having a large number of speeds, so that it has not been possible for these devices to become established for such gears.

The device according to the invention obviates these disadvantages and provides a simple, comparatively cheap and a reliable control device for gear-wheel change-speed gears, particularly those having a large number of speeds.

Advantageously, the device is so contrived that only the shut-off members for the gear-changing cylinders which, in the driving direction of the gear, operate successive transmission stages are made dependent upon the preceding transmission stages. In addition, the piston rod connected to the piston of each gear-changing cylinder is preferably so constructed that the said rod controls the gear-changing pressure medium for the other gear-changing cylinders, which medium is to be operative for a different kind of gear change. This control may be effected directly by the piston rods. With particular advantage, however, the shut-off members according to the invention are arranged separately and the pressure medium operative in the gear-changing cylinders is allowed to act upon said shut-off members.

The control device according to the invention will be employed particularly in the case of gears having a main shaft train consisting of more than two parts, and above all in gears having change-speed clutches of the overtaking or synchronising type. In such gears, the device according to the invention is not intended to prevent blocking as in the ordinary gears, but in the latter on the contrary, any combination of simultaneously engaged transmission stages is possible without blocking. The mutual locking of the transmission stages is effected in this case in order to maintain the correct speed ratio for the clutch members of the transmission stages to be engaged, which ratio may be upset by the rapid reduction in speed of sets of wheels, which are separated from the driving and driven shafts and are running idle. In addition, this step also has the purpose of accelerating as much as possible the gear-changing operation in gear changes requiring the engagement of several transmission stages.

The control device according to the invention, in gears wherein not all the speeds possible with the existing wheel arrangement are used, makes it possible to provide shut-off members according to the invention not for all gear-changing cylinders but only for some of them.

The control device according to the invention is of importance above all in the case of gears wherein special auxiliary devices of a known type are provided for retarding or accelerating the clutch member to be engaged. In such gears, the device according to the invention, in a very simple manner, prevents both the retarding and also the accelerating devices from becoming operative simultaneously, which would prevent the transmission stages from being brought properly into engagement.

In the accompanying drawings,

Figure 1 shows a change speed gear in longitudinal section.

Figure 2, corresponds to the right-hand end part of Figure 1 but shows the gear wheels in position for the reverse speed.

Figure 3 is a diagram showing the arrangement of the reverse speed gear wheels.

Figure 4:
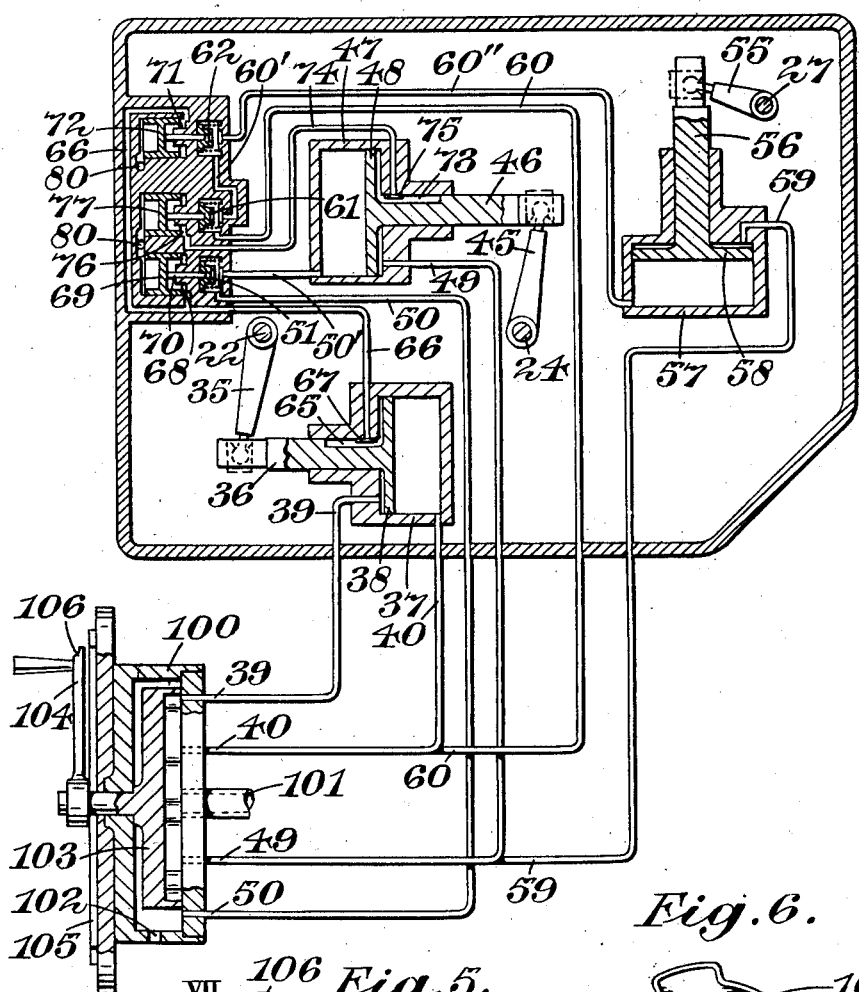
Figure 4 shows mainly in section a vacuum-actuated device according to the invention for controlling the change speed gear shown in Figure 1.

Referring to Figure 1, the main shaft gear train comprises the gear wheels, 7, 8, 9, 10 and the layshaft gear train, the gear wheels 11, 12, 13 and 14. The gear wheels, 7, 9, 11 and 13 are fast on their corresponding shaft sections 1, 2, 4 and 5 or 6, while gear wheel 10 is freely rotatable on shaft section 3 and gear wheel 14 is splined on shaft section 6. Gear wheels 7, 8, 9, 11 and 12 are mounted with their hubs 15 in the housing 16, gear wheels 8 and 12 having bores in which the adjacent shaft sections 1 and 2 or 4 and 5 are mounted. Between the permanently meshed pairs of wheels 7/11, 8/12 and 9/13 are change-speed dog clutches 17, 18 and 19, 20, which in the present case, particularly for the purpose of shortening the overall length, are constructed in such a manner that the clutches 17 and 19 are in the main shaft train and the corresponding clutches 18 and 20, respectively, are in the layshaft train. The gear changing lever 21 connecting the clutches 17 and 18 together is secured to a shaft 22 and the gear-changing lever 23 for actuating the clutches 19 and 20 is secured to a shaft 24. In addition, on the shaft section 3, is splined a double dog clutch 25, its teeth 25' being adapted to be brought into engagement with corresponding dog teeth of the gear wheel 9, and its teeth 25'' being adapted to be brought into engagement with corresponding dog teeth on the gear wheel 10. The gear-changing lever 26 for this change-speed dog clutch 25 is fast on a shaft 27. The clutch teeth of all the clutches (17, 18; 19, 20; 25) are provided with bevelled end faces, whereby engagement of the clutches is effected in known manner at the moment of overtaking.

Mounted on a further short layshaft is a reversing drive 30, 31, (see Figure 3) the gear wheel 30 whereof can be brought into engagement with the gear wheel 14, when the latter has been shifted to the left, and its gear wheel 31 can be brought into engagement with the gear wheel 10.

For engaging the reverse speed, the gear wheel 14 is first shifted to the left by means of the lever 150 and selector rod 151, and then the gear wheels 30, 31 are moved to the right by means of the lever 152 and selector rod 153. The selector rods have the usual forks 154, 155 for the engagement of the gearshift lever, only the lower end 156 of the latter being shown. The stationary intermediate bar 157 is slotted at 158 for the passage of the end of the gearshift lever 156 from one fork to the other and ensures that the gear wheels are shifted in the proper sequence to avoid locking of the transmission. In Figure 2 the right hand end of the transmission is shown with the reverse speed engaged.

The bevelling of the end faces of the dogs indicated in Figure 1 corresponds to the direction of rotation shown at wheel 7 in Figure 1. Starting for example from the engagement of the clutch 17 with the clutch member provided in gear wheel 8, as indicated in Figure 1, and if instead thereof the clutch 18 is to be brought into engagement with the corresponding clutch member mounted on gear wheel 12, then when the dogs of clutch 18 are applied to the dogs connected to gear wheel 12, the latter dogs will first be running more quickly and will therefore reject the dogs of clutch 18 (position of rejection). If now, by opening the throttle, the driver increases the speed of gear wheel 7 and hence also of gear wheel 11 and of the clutch 18 connected to shaft 4 of said gear wheel 11, the clutch 18 will finally overtake the counter-clutch member connected to gear wheel 12 and the engagement of the clutch will be effected in known manner.

Engagement takes place in a similar manner when clutch 18 is brought out of engagement and clutch 17 is engaged. In this case, the clutch member connected to gear wheel 8 is the more slowly running member. The dogs of the, at first, more rapidly running clutch 17, which move past the said clutch member connected to gear wheel 8 will be rejected until, due to the diminishing speed of the engine, their speed will also fall below that of the clutch member connected to gear wheel 8, engagement then taking place.

If the gear mechanism shown in Figure 1 permitting eight forward and four reverse speeds is employed as a seven speed gear, the following sequence of speeds may be obtained for example, 29 teeth being provided for example on the gear wheel 7, 40 teeth on gear wheel 8, 35 on gear wheel 9, 44 on gear wheel 10, 60 on gear 11, 48 on gear wheel 12, 53 on gear wheel 13 and 22 teeth on gear wheel 14;

Forward:

I. Shaft 1, gear wheel 7, gear wheel 11, shaft 4, clutch 18, gear wheel 12, gear wheel 8, clutch 19, shaft 2, gear wheel 9, gear wheel 13, shaft 6, gear wheel 14, gear wheel 10, clutch 25'', shaft 3.

II. Shaft 1, gear wheel 7, gear wheel 11, shaft 4, clutch 18, gear wheel 12, clutch 20, shaft 5, gear wheel 13, shaft 6, gear wheel 14, gear wheel 10, clutch 25'', shaft 3.

III. Shaft 1, clutch 17, gear wheel 8, clutch 19, shaft 2, gear wheel 9, gear wheel 13, shaft 6, gear wheel 14, gear wheel 10, clutch 25''.

IV. Shaft 1, gear wheel 7, gear wheel 11, shaft 4, clutch 18, gear wheel 12, gear wheel 8, clutch 19, shaft 2, gear wheel 9, clutch 25', shaft 3.

V. Shaft 1, gear wheel 7, gear wheel 11, shaft 4, clutch 18, gear wheel 12, clutch 20, shaft 5, gear wheel 13, gear wheel 9, clutch 25', shaft 3.

VI. Shaft 1, clutch 17, gear wheel 8, clutch 19, shaft 2, gear wheel 9, clutch 25', shaft 3 (direct drive).

VII. Shaft 1, clutch 17, gear wheel 8, gear wheel 12, clutch 20, shaft 5, gear wheel 13, gear wheel 9, clutch 25', shaft 3 (speed shown in drawing).

A reverse drive is for example:

Shaft 1, gear wheel 7, gear wheel 11, shaft 4, clutch 18, gear wheel 12, gear wheel 8, clutch 19, shaft 2, gear wheel 9, gear wheel 13, shaft 6, gear wheel 14, gear wheel 30, gear wheel 31, gear wheel 10, clutch 25'', shaft 3.

If the gear box shown is used as a six-speed gear, the sequence of speeds shown hereunder may be obtained for example (of course, the transmission ratios of the various gear wheels is altered correspondingly):

Forward:
$Ia$ as I
$IIa$ as II
$IIIa$ as IV
$IVa$ as V
$Va$ as VI
$VIa$ as VII

Reverse:
$Ra$ as R.

As will be seen in Figure 4, mounted on the shaft 22 connected to the operating lever 21 for the change-speed dog clutch 17, 18 is an actuating arm 35 which is adapted to be rocked by the piston rod 36 of a piston 38 slidable in a cylinder 37. Opening into said cylinder 37, on the right and left of piston 38 respectively, are conduits 39 and 40 both of which lead to a speed selector 100.

In the same way, secured to the shaft 24 connected to the operating lever 23 for the change-speed dog clutch 19, 20 is an actuating arm 45 adapted to be rocked by the piston rod 46 of a piston 48 slidable in a cylinder 47. Opening into this cylinder 47 on opposite sides of the piston 48 are respectively conduits 49 and 50, 50', which lead to the speed selector 100, and of which the conduit 50, 50' opening into the cylinder on the left of piston 48 is adapted to be closed by a spring-opened valve 51.

Mounted on the shaft 27 connected to the operating lever 26 for the change-speed dog clutch 25 is an actuating arm 55 which is adapted to be rocked by means of the piston rod 56 of a piston 58 slidable in a cylinder 57. Opening into this cylinder on the upper and lower side of the piston 58, respectively, are conduits 59 and 60, 60', 60'', the conduit 60 being adapted to be shut off from the conduit section 60' by a spring-opened valve 61, and the conduit section 60' from the conduit section 60'' likewise by a spring-opened valve 62.

In the piston rod 36 is formed a groove 65 extending to the cylinder space situated on the left of the piston 38. In the right-hand end position of the piston, that is to say, when the clutch 18 is engaged, and in intermediate positions of the piston 39 as far as the position of rejection of clutch 17, the groove 65 is connected to a further conduit 66 starting from the cylinder 37. When the piston moves into its extreme left hand end position, that is to say when the clutch 17 is fully engaged, the connection of said conduit 66 to the groove 65 and hence to the cylinder space situated on the left of piston 38, is interrupted by a bridge 67. The conduit 66 leads to a cylinder space 68, the slidable piston 69 whereof is adapted to act, for example by means of a push rod 70, on the valve 51 controlling the supply of pressure medium to the cylinder 47 on the left of piston 48. In addition said conduit 66 leads to a further cylinder space 71, the piston 72 whereof is adapted to control the valve 62 provided between the conduit sections 60' and 60''. When the piston 38 is in its left hand end position, so that vacuum is shut-off from the conduit 66, air leaks into the spaces 68 and 71 through the clearances provided between the various moving parts, or through a vent orifice specially provided for the purpose, so that the valves 51 and 62 open under the pressure of their springs.

The piston rod 46 is provided with a groove 73 extending to the cylinder space situated to the right of piston 48, which groove, in the left-hand end position of the piston, that is to say when clutch 19 is engaged, and in intermediate positions of the piston 48 up to the position of disengagement of the clutch 20, is connected to a further conduit 74 starting from the cylinder 47, whilst the connection of this conduit 74 with the groove 73 is interrupted by a bridge 75 in the right-hand end position of the piston, that is to say, when the clutch 20 is engaged. The conduit 74 leads to a cylinder space 76, the piston 77 whereof is adapted to act on the valve 61 disposed between the conduit sections 60 and 60'. When the piston 48 is in its right hand end position air leaks into the space 76 in the manner described above in connection with the spaces 68 and 71, with the result that the valve 61 opens. Passages 80 lead from the cylinder spaces on the left of the pistons 69, 72 and 77 to the outer air.

If the upward gear changes of the speeds of the seven-speed gear according to the foregoing arrangement are followed one speed at a time, the following is obtained on changing from

|  | Clutches remaining engaged | Clutches to be engaged |
| --- | --- | --- |
| 1st to 2nd speed | 18 — 25'' | — 20 — |
| 2nd to 3rd speed | — — 25'' | 17  19 — |
| 3rd to 4th speed | — 19 — | 18— — 25' |
| 4th to 5th speed | 18— 25' | — 20 — |
| 5th to 6th speed | — — 25' | 17  19 |
| 6th to 7th speed | 17 — 25' | — 20 — |

Of course, as in any change speed gear, the simple upward changes are retardation gear changes and the simple downward gear changes are acceleration gear changes, whilst in the case of multiple gear changes, both retardation and also acceleration gear changes are to be performed.

The pressure medium conduits 39, 40, 49, 50, 59 and 60 are connected to ports in the rear face of the hollow body of the selector valve 100. Inside the hollow body is arranged a valve member 103 of complicated shape which is movable by means of a handle 104 into seven positions each corresponding to one of the forward speeds. The seven positions are indicated by a scale 105 co-operating with a pointer 106 provided on the handle 104. A main pressure medium conduit 101 leads from a port in the centre of the rear face of the casing to the induction system of the engine of the vehicle and an orifice 102 places the interior of the valve casing in communication with the outer air.

Figures 5, 6:
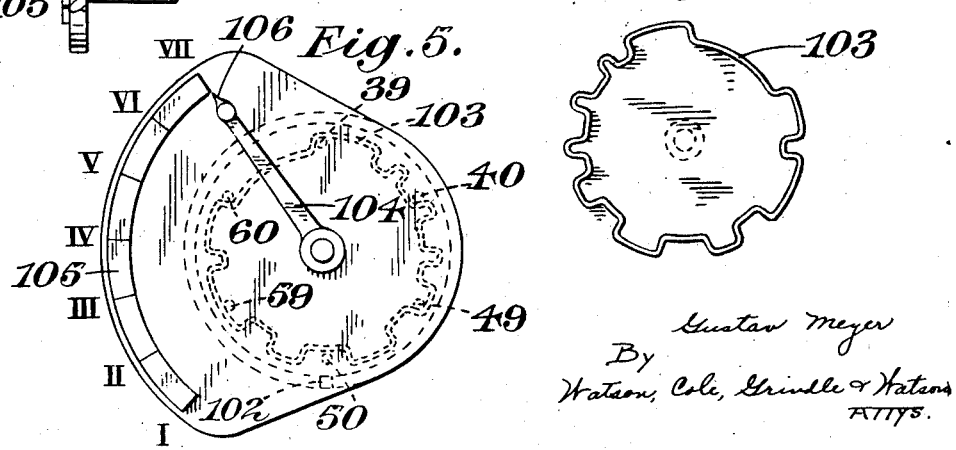
Figure 5 is a front view of the speed selecting valve 100 shown in section in Figure 4.
Figure 6 is a rear view of the valve member of the speed-selecting valve 100.

Figure 6 is a view of the valve member 103 from the rear showing the shape of its periphery. The periphery is so shaped that in each position of the valve the appropriate three pressure medium conduits are connected to the main conduit 101 and the other three are connected to the outer air. The following table shows the various connections:

| Speed | Vacuum connections | Connected to the outer air |
|---|---|---|
| I | 40, 50, 60 | 39, 49, 59 |
| II | 40, 60, 49 | 39, 59, 50 |
| III | 60, 39, 50 | 40, 49, 59 |
| IV | 40, 50, 59 | 39, 49, 60 |
| V | 40, 59, 49 | 39, 60, 50 |
| VI | 50, 39, 59 | 49, 40, 60 |
| VII | 39, 59, 49 | 40, 60, 50 |

The operation of the control device and transmission shown in Figures 1, 4, 5 and 6 is as follows:

Taking first the case of a simple upward gear change, for example from first speed to second speed, the conduit 49 necessary for the disengagement of clutch 19 and the engagement of clutch 20 will be connected to the source of vacuum after the selection of the second speed by the speed selector 100. The piston 48 situated in its left-hand end position is thereby moved to the right, the clutch 19 is disengaged by the lever mechanism 45, 24, 23, and the clutch member 20 is applied to the clutch member provided on gear wheel 12 where it is at first rejected on account of its lower speed of rotation. When the speed of gear wheel 12 has been reduced, either merely by closing the throttle or by means of a special auxiliary device by exerting a braking action on the gear wheels 7, 11, 8, 12 situated on the driving side, down to the speed of gear wheel 13 or of the shaft element 5 and hence of the clutch member 20 and begins to drop below the latter, the clutch 20 engages in known manner.

As example of double gear-changing in upward changing, the changes from the second to the third and from the third to the fourth speeds will be described in the following. In the second speed, the clutches 18, 20, 25" are engaged, the pistons 38 and 48 are in their right-hand end positions, and the piston 58 is in its lower end position. On changing to the third speed, the clutch 25" remains engaged and the clutches 18 and 20 have to be disengaged and clutches 17 and 19 engaged. Since the clutch 17 is rotating more rapidly than the wheel 8, it is necessary, in order to secure rapid engagement of clutch 17 to exert a braking action on clutch 17 in the position of rejection until the overtaking speed has been attained, whilst for rapid engagement of clutch 19, which at first is rotating more rapidly than the counter-clutch member on wheel 8, acceleration of the clutch member on gear wheel 8 is necessary.

For attaining a more rapid course of the gear-changing operation, the retardation device should first be operative according to the invention and then the accelerating device. This is accomplished in the following manner. After suitable setting of the gear selector, the vacuum acting through the conduit 39 on the piston 38 moves this piston at first so far to the left that clutch 17 is in the position of rejection at wheel 8. Engagement does not yet take place because the clutch 17 is running more rapidly than the counter-clutch. The vacuum existing on the left of piston 38 simultaneously passes via groove 65 and conduit 66 to the cylinder 68 and draws the small piston 69 to the right. The valve 51 is thereby likewise moved to the right against the force of the spring acting upon it, and the communication between the conduit 50 and the conduit section 50' is thereby interrupted. The vacuum supplied by the gear selector to the conduit 50 upon selecting the third speed cannot therefore yet act on piston 48. The clutch 20 therefore at first remains engaged. Only when, due to the drop in speed of the engine, the speed of clutch 17 begins to fall below that of wheel 8 is it possible for the piston 38 to move completely into its left-hand end position and cause engagement of clutch 17. The bridge 67 on the piston rod 36 now shuts off the further passage of the vacuum through the conduit 66. Due to the disappearance of the vacuum (on account of leakage or by means of a special communication with the outer air) the small piston 69 returns to its left-hand end position. The valve 51 is forced to the left by its spring and permits the passage of vacuum from the conduit 50 to the conduit 50'. The piston 48 is now drawn to the left by the vacuum, the clutch 20 comes out of engagement, the clutch member 19 is applied to the counter-clutch member on wheel 8, where it is at first rejected on account of the difference in speeds. It comes into engagement, the piston 48 moving into its left-hand end position, as soon as by opening of the throttle (most rapidly by means of an accelerating device of known kind) the speed of wheel 8 has been increased to the overtaking speed. The change from second to third speed is thereby completed.

On changing from third to fourth speed, the clutch 19 remains engaged, whilst the clutch 17 is disengaged and instead thereof the clutch 18 is engaged; likewise clutch 25" will be disengaged and instead thereof clutch 25' will be engaged. Since the clutch 18 rotates more slowly than the clutch member provided on the left of gear wheel 12, it is necessary, in order to secure rapid engagement, for the clutch member 18 to be accelerated in the position of rejection by opening the throttle until the overtaking speed has been attained, whilst for the rapid engagement of the clutch member 25' which at first rotates more slowly than the counter-clutch member on the gear wheel 9, braking of the said counter-clutch member is necessary.

By setting the gear selector for the fourth speed, conduits 40 and 59 are connected to the source of vacuum. The piston 38, previously in its left-hand end position, moves to the right, brings the clutch 17 out of engagement and applies the clutch member 18 to the counter-clutch on the gear wheel 12. The piston 58, previously in its lower end position, is moved upwardly by the vacuum supplied from conduit 59, brings the clutch member 25" out of engagement and applies the clutch member 25' to the counter-clutch on the gear wheel 9. The two gear wheel pairs 8, 12 and 9, 13 are now uncoupled both from the driving shaft 1 and also from the driven shaft 3. Owing to their low mass and the existing oil friction, their speed falls rapidly. Due to the closing of the throttle by the driver during the gear-changing operation, the speed of the gear wheel pair 7, 11 connected to the engine also falls, but substantially more slowly than that of gear wheels 8, 12, 9, 13. The substantially more rapid drop in speed of the clutch member provided on gear wheel 12, relatively to the clutch member 18, acts in the same way as an increase in speed of the clutch member 18, so that after a short time, the clutch member 18 comes into engagement. Due to the further reduction in speed, which may be hastened by braking the driving side, the speed of the clutch member provided in the right of gear wheel 9 is reduced until it falls below that of the clutch member 25', whereupon the latter comes into engagement. Gear-changing from the third to the fourth speed is thereby concluded.

As examples of downward gear-changing operations, the changes from the fourth to the third, from the third to the second and from the second to the first speed will now be described.

In the fourth speed, the clutches 18, 19 and 25' are engaged. On changing to the third speed, the clutch 19 remains engaged, whilst on the contrary, the clutches 18 and 25' are disengaged and instead thereof the clutches 17 and 25" are engaged. As mentioned, the former requires a retardation gear-change and the latter an acceleration gear-change. In the same way as described above in the case of upward gear-changing from the second to the third speed, the vacuum supplied through the conduit 39 to the piston 38, and further led, in front of the small pistons 69 and 72, prevents the supply of vacuum to the conduit sections 50' and 60". Consequently, the vacuum at first is only able to move the piston 38 to the left and thereby disengage the clutch 18 and move the clutch 17 into the position of rejection. After being braked to the overtaking speed, the clutch 17 engages, the piston 39 being moved completely into its left-hand end position. The passage of vacuum to the conduit 66 is thereby interrupted by the bridge 67, whereby the pistons 69 and 72 with the valves 51 and 62 are moved to the left under the action of the springs loading said valves. The vacuum supplied through the conduit 60 and arriving at the valve 62 by way of the conduit section 60', is thereby able to pass into the conduit 60", and effect the downward movement of the piston 58 in the cylinder 75. The clutch 25' is thereby disengaged and the clutch 25" is applied to the clutch member provided on gear wheel 10. The clutch 25" engages as soon as, by opening the throttle, the speed of gear wheel 10 has been accelerated to the overtaking speed.

On changing to the second speed, the clutch 25" remains engaged, whilst on the contrary, the clutches 17 and 19 are disengaged and instead thereof the clutches 18 and 20 are engaged. The engagement of clutch 18 requires an acceleration of this clutch. In order to engage clutch 20, the speed of the clutch member provided on the right of gear wheel 12 must be reduced to the overtaking speed. On setting the gear selector for the second speed, the vacuum supply to the conduits 40 and 49 is released. Both pistons move to the right from their left-hand end positions. Clutches 17 and 19 are disengaged and clutches 18 and 20 are brought into the position of rejection at the counter-clutch members on the gear wheel 12. The speed of the gear wheel pair 8, 12 now falls rapidly in the same way as described above. The overtaking speed is thereby attained first in the case of clutch 18, so that said clutch can engage. Due to the further reduction in speed of the gear wheel, which is now connected with the engine, the speed of the counter-clutch member on the gear wheel 12 opposite the clutch member 20 is also reduced, if desired by braking of the gear wheels connected to the driving side, to the speed of the clutch member 20 or below that speed, so that the clutch member 20 is able to engage. Gear changing from the third to the second speed is thus completed.

In changing from the second to the first speed, the clutches 18 and 25" remain engaged, whilst the clutch 20 must be disengaged and clutch 19 engaged. The latter, after the removal of clutch 20 from engagement, runs more rapidly than the counter-clutch member on the wheel 8. The latter must therefore be accelerated by opening the throttle. This is effected by the fact that on setting the gear selector from the second to the first speed, the conduit 50 is connected to the source of vacuum. This vacuum is then able to pass the valve 51 without obstruction and enter the conduit section 50' to the cylinder 47. The piston 48 is thereby moved to the left, the clutch 20 is disengaged and the clutch 19 is moved to the position of rejection. It engages as soon as the overtaking speed has been attained by accelerating the gear wheel 8.

As will be seen from the foregoing, in the control device described, in some of the double gear-changing operations, the cylinders operative for a retardation gear change prevent an acceleration gear change of another cylinder from taking place. In the case of others of the double gear-changing operations, the admission of pressure medium takes place without obstruction for both gear-changing cylinders. In this case, therefore, both previously engaged clutches are disengaged and the two clutch members to be engaged arrive simultaneously at the position of rejection. Due to the reduction in speed of the gear wheels which are running idle in this case, the engagement of the clutch requiring an acceleration gear change is first effected automatically. This kind of gear-changing proceeds in the case of the double changes in which an acceleration gear change is to be effected in the first gear stage in the driving direction.

As examples of three-fold gear-changing, the changes from the third to the fifth and from the fifth to the third speed will be described. In the third speed, the clutches 17, 19, 25" are engaged. On changing to the fifth speed, all these must be disengaged and the clutches 18, 20, 25' must be engaged in their place. The engagement of clutch 18 requires an acceleration gear change while the engagement of clutch 20 and that of clutch 25' require retardation gear changes. The pressure medium for the three gear-changing cylinders can enter the conduits 40, 49 and 59 directly without obstruction. Therefore, all three clutches are immediately disengaged. Due to the rapid reduction in speed occurring during the idle running of the gear wheel pair 8, 12, the clutch 18 rapidly comes into engagement with the counter-clutch member on the gear wheel 12. Due to the further reduction in speed, which if desired may be hastened by an auxiliary device, the clutch 20 first comes into engagement with gear wheel 12 and thereupon the clutch 25' with gear wheel 9.

On changing from the fifth to the third speed, the clutches 18, 20, 25' must be disengaged and clutches 17, 19 and 25" engaged. The clutch 17 requires a retardation gear change, while the clutches 19 and 25" each require an acceleration gear change. The vacuum for the retardation gear change is supplied to the gear changing cylinder 37 through the conduit 39 and, in the manner described above, prevents the admission of the pressure medium necessary for the acceleration gear changes to the cylinders 47 and 57 by the valves 51 and 62 until the clutch 17 has been engaged. Only then is the admission of vacuum from the conduit 50 through the valve 51 and the conduit section 50' to the cylinder 47 and from the conduit 60 through the valve 61 and the conduit section 60' through the valve 62 and the conduit section 60" to the gear-changing cylinder 57 released. The clutches 20 and 25' now disengage and the clutches 19 and 25" arrive in the position of rejection at the gear wheels 8 and 10 respectively. If the gear-changing operation is now not accelerated by opening the throttle and since the speed of the idly running gear wheel pair 9, 13 rapidly falls, the clutch 19 will first be engaged at the gear wheel 8, because the said fall in speed acts in the same way as if the speed of gear wheel 8 had been accelerated until it had reached the necessary engagement speed for the clutch 19. The engagement of clutch 25" at the gear wheel 10 is then effected after the speed of the gear wheel 10 has been accelerated by the driver or by means of a suitable auxiliary device. If the throttle has already been opened, as long as the two clutch members 19 and 25" are in the position of rejection at the gear wheels 8 and 10, engagement of the two clutches will take place in the same sequence.

The control device according to the invention may be employed in fundamentally the same way for gear-changing devices operated by pressure or vacuum. It is also not limited to gears of the arrangement, type and transmission ratios shown, but may also be employed in fundamentally the same way for gears of a different type. In particular, for example, instead of subdivided change-speed clutches (for example 17, 18) (arranged on two different shafts), it is also possible to employ one-part change-speed clutches, as shown by the change-speed clutch 25 between the gear wheels 9 and 10. Conversely, the latter may also be replaced by a sub-divided change-speed clutch. The control device according to the invention may also be employed for gears having different transmission stages from those of the example shown, in which case, in certain circumstances, it is possible by means of the transmission stages, to vary the sequence of the operation of the various gear-changing cylinders and thereby the arrangement of the shut-off valves. More particularly, for example, it is also possible if necessary to connect the third gear-changing cylinder to a control acting on the admission of pressure medium to one or more of the preceding gear-changing cylinders.

In order to secure the quickest possible course of the gear-changing operation, the device may be so arranged that a special control communication with the outer air is provided in the bridges 67 and 75. The bridges may also be omitted entirely or a communication to the adjacent space in front of the piston of the cylinder concerned may be provided. The latter will be employed above all in control devices in which, immediately after the end position of the piston of the gear-changing cylinder has been attained, the conduit supplying the pressure medium is connected to the outer air by the control device itself.

I claim:

1. A control device for a gear wheel change speed gear comprising a plurality of fluid-pressure-operated gear-shifting pistons, a speed selecting valve for selectively controlling the flow of pressure medium to the cylinders of said pistons, a group of conduits leading from said selecting valve to one end of each cylinder, a group of conduits leading from said selecting valve to the other cylinder ends, normally open shut-off valves in at least some of the conduits of one only of said groups, fluid-pressure-operated means other than said pistons for closing said shut-off valves, and a connecting conduit between each of said fluid-pressure-operated means and a conduit of the other of said groups.

2. In a control device as claimed in claim 1, a valve device in each of said connecting conduits operatively connected to the piston corresponding to the group conduit to which the connecting conduit is connected, so as to interrupt said conduit connection when said piston reaches its end position consequent upon pressure variation in said group conduit.

3. A control device for a gear wheel change speed gear comprising a plurality of fluid-pressure-operated gear-shifting pistons, a speed selecting valve for selectively controlling the flow of pressure medium to the cylinders of said pistons, a group of conduits leading from said selecting valve to one end of each cylinder, a group of conduits leading from said selecting valve to the other cylinder ends, normally open shut-off valves in all except one of the conduits of one only of said groups, fluid-pressure-operated means other than said pistons for closing said shut-off valves, and a connecting conduit between each of said fluid-pressure-operated means and a conduit of the other of said groups.

4. A transmission comprising in combination a gear wheel change speed gear of the kind having disengageable positive engaging gear-change members for effecting changes of ratio, acceleration of the driving shaft being necessary for the engagement of some of said gear-change members and retardation of the driving shaft being necessary for the engagement of others, and in which the selection of at least one of the gear ratios requires the engagement of gear-change members requiring acceleration and of gear-change members requiring retardation, and a control device comprising fluid-pressure-operated pistons operatively connected with said gear-change members, a speed selecting valve for selectively controlling the flow of pressure medium to the cylinders of said pistons, a group of conduits leading from said selecting valve to those cylinder ends in which a variation of pressure causes movement of the corresponding piston to effect the engagement of gear-change members requiring acceleration of the driving shaft for their engagement, a group of conduits leading from said selecting valve to the other cylinder ends, normally open shut-off valves in all the conduits of one only of said groups except the conduit leading to the cylinder pertaining to the gear-change member shifting mechanism nearest the driving end of the change speed gear, fluid-pressure-operated means other than said pistons for closing said shut-off valves, a connecting conduit between each of said fluid-pressure-operated means respectively and that conduit of the other of said groups which is connected to the cylinder pertaining to the gear-change member shifting mechanism which precedes the gear-change member shifting mechanism pertaining to the cylinder in the group conduit of which the shut-off valve operated by the fluid-pressure-operated means is situated.

5. In a transmission as claimed in claim 4, a further shut-off valve arranged in series with the shut-off valve in the conduit leading to the cylinder pertaining to a third gear-change member shifting mechanism from the driving end of the change-speed-gear, fluid-pressure-operated means for closing said further shut-off valve, and a connecting conduit between said fluid-pressure-operated means and that conduit of the other of said groups which is connected to the cylinder pertaining to the first gear-change member shifting mechanism.

6. A transmission comprising in combination a gear wheel change speed gear of the kind having disengageable positive engaging gear-change members for effecting changes of ratio, acceleration of the driving shaft being necessary for the engagement of some of said gear-change members and retardation of the driving shaft being necessary for the engagement of others, and in which the selection of at least one of the gear ratios requires the engagement of gear-change members requiring acceleration and of gear-change members requiring retardation, and a control device comprising fluid-pressure-operated pistons operatively connected with said gear-change members, a speed selecting valve for selectively controlling the flow of pressure medium to the cylinders of said pistons, a first group of conduits leading from said selecting valve to those cylinder ends in which a variation of pressure causes movement of the corresponding piston to effect the engagement of gear-change members requiring acceleration of the driving shaft for their engagement, a second group of conduits leading from said selecting valve to the other cylinder ends, normally open shut-off valves in at least some of the conduits of said first group, fluid-pressure-operated means other than said pistons for closing said shut-off valves, and a connecting conduit between each of said fluid-pressure-operated means and a conduit of said second group.

GUSTAV MEYER.